United States Patent [19]

Naoi et al.

[11] Patent Number: 4,853,885

[45] Date of Patent: Aug. 1, 1989

[54] METHOD OF COMPRESSING CHARACTER OR PICTORIAL IMAGE DATA USING CURVE APPROXIMATION

[75] Inventors: Satoshi Naoi, Tokyo; Akira Inoue, Kawaguchi; Katsuhiko Nishikawa; Shigemi Nagata, both of Kawasaki, all of Japan

[73] Assignee: Fujitsu Limited, Kawasaki, Japan

[21] Appl. No.: 52,431

[22] Filed: May 21, 1987

[30] Foreign Application Priority Data

| May 23, 1986 | [JP] | Japan | 61-117485 |
| May 23, 1986 | [JP] | Japan | 61-118920 |
| Sep. 18, 1986 | [JP] | Japan | 61-220400 |
| Apr. 14, 1987 | [JP] | Japan | 62-091805 |

[51] Int. Cl.$^4$ .......................................... G06F 15/353
[52] U.S. Cl. ..................................... 364/718; 364/723
[58] Field of Search .................. 364/718, 723; 382/56

[56] References Cited

U.S. PATENT DOCUMENTS

| 3,652,839 | 3/1972 | Maekawa et al. | 364/718 |
| 3,789,203 | 1/1974 | Catherall | 364/723 |
| 4,158,887 | 6/1979 | Kosugi | 364/723 |
| 4,272,808 | 6/1981 | Hartwig | 364/718 |

FOREIGN PATENT DOCUMENTS 2147474A 5/1985 United Kingdom .

Primary Examiner—David H. Malzahn
Attorney, Agent, or Firm—Staas & Halsey

[57] ABSTRACT

A method of curve approximation comprises a dividing step for dividing a curve into arcs classified into four quadrant directions according to a normal thereof, each having a single-value monotone increasing or decreasing function, and a calculating step for calculating an approximate curve represented by a curve approximation function by using an interval between end points of each arc as a curve approximation interval.

11 Claims, 11 Drawing Sheets

| BENDING POINT | LINE GROUP NUMBER | POSITION | ORNAMENT | CURVE ATTRIBUTE | CURVE GROUP NUMBER | APPROXIMATE INTERVAL |
|---|---|---|---|---|---|---|
| $P_1$ | | | | | | $S_7$ |
| $P_2$ | | | | IV | $F_1$ | $S_1$ |
| $P_3$ | | | | IV | $F_1$ | $S_1$ |
| $P_4$ | $G_1$ | RIGHT | | | | $S_1$ |
| $P_5$ | $G_1$ | RIGHT | | III | $F_2$ | $S_2$ |
| $P_6$ | | | | III | $F_2$ | $S_2$ |
| $P_7$ | $G_2$ | UNDER | | | | $S_2$ |
| $P_8$ | $G_2$ | UNDER | | | | |
| $P_9$ | $G_2$ | UPPER | | | | |
| $P_{10}$ | $G_2$ | UPPER | | I | $F_2$ | $S_3$ |
| $P_{11}$ | | | | I | $F_2$ | $S_3$ |
| $P_{12}$ | $G_1$ | LEFT | | | | $S_3$ |
| $P_{13}$ | $G_1$ | LEFT | | II | $F_1$ | $S_4$ |
| $P_{14}$ | | | | II | $F_1$ | $S_4$ |
| $P_{15}$ | | | | III | $F_3$ | $S_5$ | $S_4$ |
| $P_{16}$ | | | | III | $F_3$ | $S_5$ |
| $P_{17}$ | $G_3$ | UNDER | | | | $S_5$ |
| $P_{18}$ | $G_3$ | UNDER | | II | $F_4$ | $S_6$ |
| $P_{19}$ | | | | II | $F_4$ | $S_6$ |
| $P_{20}$ | $G_4$ | LEFT | | | | $S_6$ |
| $P_{21}$ | $G_4$ | LEFT | | I | $F_5$ | $S_7$ |
| $P_{22}$ | | | | I | $F_5$ | $S_7$ |
| $P_{23}$ | | | | III | $F_5$ | $S_{10}$ | $S_8$ |
| $P_{24}$ | | | | III | $F_5$ | $S_8$ |
| $P_{25}$ | $G_4$ | RIGHT | | | | $S_8$ |
| $P_{26}$ | $G_4$ | RIGHT | | IV | $F_4$ | $S_9$ |
| $P_{27}$ | | | | IV | $F_4$ | $S_9$ |
| $P_{28}$ | $G_3$ | UPPER | | | | $S_9$ |
| $P_{29}$ | $G_3$ | UPPER | | I | $F_3$ | $S_{10}$ |
| $P_{30}$ | | | | I | $F_3$ | $S_{10}$ |

| BENDING POINT | LINE GROUP NUMBER | POSITION | ORNAMENT | CURVE ATTRIBUTE | CURVE GROUP NUMBER | APPROXIMATE INTERVAL |
|---|---|---|---|---|---|---|
| $P_1$ | | | | | $F'_1$ | $S'_1$ |
| $P_2$ | | | | IV | $F'_1$ | $S'_1$ |
| $P_3$ | | | | IV | $F'_2$ | $S'_1$ $S'_2$ |
| $P_4$ | | | | | $F'_2$ | $S'_2$ |
| $P_5$ | | | | III | $F'_2$ | $S'_2$ |
| $P_6$ | | | | III | $F'_3$ | $S'_3$ $S'_2$ |
| $P_7$ | $G_1$ | UNDER | | | | $S'_3$ |
| $P_8$ | $G_1$ | UNDER | | | | |
| $P_9$ | $G_1$ | UPPER | | | | |
| $P_{10}$ | $G_1$ | UPPER | | I | $F'_3$ | $S'_4$ |
| $P_{11}$ | | | | I | $F'_2$ | $S'_4$ $S'_5$ |
| $P_{12}$ | | | | | $F'_2$ | $S'_5$ |
| $P_{13}$ | | | | II | $F'_2$ | $S'_5$ |
| $P_{14}$ | | | | II | $F'_1$ | $S'_6$ $S'_5$ |
| $P_{15}$ | | | | III | $F'_4$ | $S'_6$ $S'_7$ |
| $P_{16}$ | | | | III | $F'_4$ | $S'_7$ |
| $P_{17}$ | $G_2$ | UNDER | | | | $S'_7$ |
| $P_{18}$ | $G_2$ | UNDER | | II | $F'_5$ | $S'_8$ |
| $P_{19}$ | | | | II | $F'_6$ | $S'_8$ $S'_9$ |
| $P_{20}$ | | | | | $F'_6$ | $S'_9$ |
| $P_{21}$ | | | | I | $F'_6$ | $S'_9$ |
| $P_{22}$ | | | | I | $F'_1$ | $S'_1$ $S'_9$ |
| $P_{23}$ | | | | III | $F'_1$ | $S'_{10}$ $S'_{13}$ |
| $P_{24}$ | | | | III | $F'_6$ | $S'_{10}$ $S'_{11}$ |
| $P_{25}$ | | | | | $F'_6$ | $S'_{11}$ |
| $P_{26}$ | | | | IV | $F'_6$ | $S'_{11}$ |
| $P_{27}$ | | | | IV | $F'_5$ | $S'_{12}$ $S'_{11}$ |
| $P_{28}$ | $G_2$ | UPPER | | | | $S'_{12}$ |
| $P_{29}$ | $G_2$ | UPPER | | I | $F'_4$ | $S'_{13}$ |
| $P_{30}$ | | | | I | $F'_4$ | $S'_{13}$ |

SINGLE VALUE FUNCTION OF X

Fig. 12B

SINGLE VALUE FUNCTION OF Y

Fig. 12C

SINGLE VALUE FUNCTION OF Y

SINGLE VALUE FUNCTION OF X

METHOD OF COMPRESSING CHARACTER OR PICTORIAL IMAGE DATA USING CURVE APPROXIMATION

BACKGROUND OF THE INVENTION

1. Field of the Invention

The present invention relates to a curve approximation method for approximating a curved portion of a contour of a character or picture, etc., by using a curve approximation function. The present invention is utilized for approximating the contour of the character, etc., by straight lines and curves to compress and store the pattern data of the character, and is particularly used in industry for computers, word-processors, and computerized type-setting.

2. Description of the Related Art

A method in which the total number of dots constituting the pattern of the character are stored is known. However, in this method, too much data must be stored, and when an enlarged pattern and reduced pattern, etc., of the original pattern are produced on the basis of the total number of dots of the pattern, an obligue line and curved stroke (referred to as curved stroke hereinafter) can not be made smooth, and therefore, a high quality pattern can not be obtained.

Accordingly, a pattern compressing method in which only a small amount of pattern data of the character and picture, etc., need be stored, and a high quality pattern can be obtained when enlargement and reduction are carried out, has become necessary. A method is known in which the pattern is represented by a contour, and this method is effective for data compression. That is, the contour of the pattern is approximated by straight lines and curves, and only the data relating to the approximated straight lines and curves is stored, thereby reducing the amount of the data to be stored. A high quality pattern for expansion or reduction, etc., can be obtained by this method.

A method in which the contour of the character pattern is expressed by an approximated curve is disclosed in UK Patent Application GB No. 2147474A to the Shaken Co., Ltd., entitled "Method of processing character or pictorial image data" and published on May 9, 1985, and will be explained hereinafter.

That is, in this method, the curve approximation is carried out by sequentially changing the segment, using a residual as an evaluation standard, and the segment is approximated by using a spline function on the basis of slopes and coordinates at both end points. The function representing the curve must be a single-value function with respect to one axis, for example, an X-axis, when the contour is approximated by curves. Therefore, these segments traced on the contour of the character are divided into sections wherein only one y-value exists with respect to one X-value.

The curved portion is expressed by a polynominal of the n-th degree (n=2 or 3). The coefficient of the polynominal of the n-th degree is determined on the basis of slopes and coordinates at both end points of an interval to be curve-approximated. To carry out the curve approximation, the slope at each contour point (the point on the contour) is calculated, the approximate curve is determined on the basis of two contour points on the contour, the deviation between the approximate curve and the contour is calculated with respect to each contour point, the contour point is moved forward by one to repeat the same process when the deviation with respect to the curve approximate interval now in question is less than an allowable error, the longest interval (sampling interval) wherein the deviation is within the allowable error is determined, and the contour is divided into these sampling intervals.

However, this prior art method has a low processing speed, since the calculation of the approximate curve is repeated until the deviation exceeds the allowable error.

Further, this method does not always realize a correct curve approximation, since the method does not consider the curve vibration phenomenon. That is, the possibility of the occurrence of vibration of the approximated curve obtained by afore-mentioned method. This vibration can be detected by determining whether or not the approximated curve as a maximal value and/or a minimal value (referred as an extreme value hereinafter). But, if the contour is divided according to the method of the prior art, to carry out the curve approximation, a curve having an extreme value may exist. Accordingly, it is not easy to detect the vibration by finding the extreme value within the approximation interval.

SUMMARY OF THE INVENTION

In accordance with the present invention, there is provided a method for curve approximation comprising the following steps: dividing a curve into arcs classified into four quadrant directions according to a normal thereof and each having a single-value monotone increasing function or single-value monotone decreasing function; and calculating an approximate curve represented by a curve approximation function by using an interval between end points of each arc as a curve approximation interval.

BRIEF DESCRIPTION OF THE DRAWINGS

Embodiments of a curve approximating method in accordance with the present invention will be now described with reference to the accompanying drawings, in which.

DESCRIPTION OF THE PREFERRED EMBODIMENTS

A method for obtaining a curve approximation will be described hereinafter using an example of pattern data compression in which this method is used for approximating a contour of a character.

Figure 1:
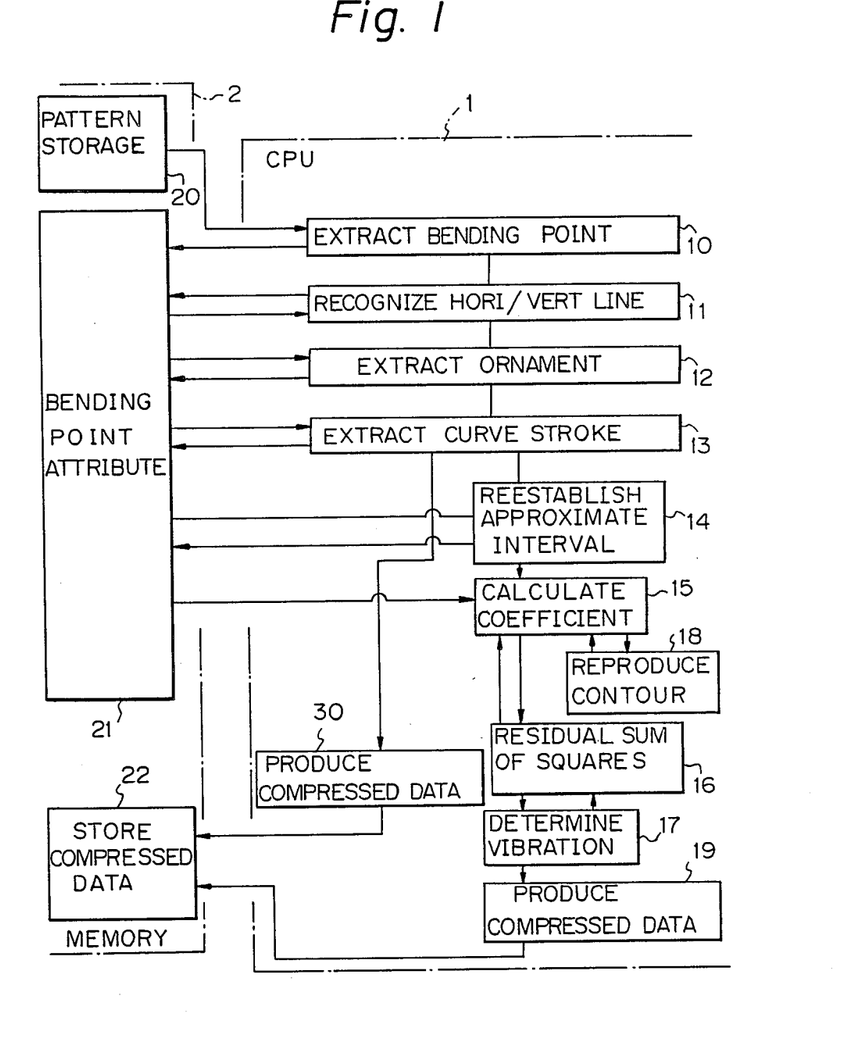
FIG. 1 is a functional block diagram of a data processing system in which the present invention is executed.

The present invention is carried out by a data processing system comprising a processor and a memory. FIG. 1 is a functional block diagram of such data processing system, and shows the many kind of functions executed by the system, as a set of functional blocks.

In FIG. 1, 1 denotes a processor or CPU for carrying out a data compressing process by executing a program; 2, a memory comprising a pattern storage element 20 for storing dot pattern data to be compressed, a bending point attribute table 21 for storing extracted bending points and extracted attributes thereof, and a compressed data storage element 22 for storing the compressed data.

Numeral 10 denotes a bending point extracting element for extracting a bending point on the contour of a character or pictorial image; 11, a horizontal/vertical line recognition element for extracting a horizontal line portion and a vertical line portion from a contour vector of the character and pictorial pattern obtained from the bending point of the bending point attribute table 21, to add the attribute of the horizontal line and vertical line to the bending point in question in the attribute Table 21, 12, an ornament extraction element for extracting an ornamental part of the character and pictorial pattern from the contour vector of the pattern, to add the attribute of the ornament to the bending point in question in Table 21; 13, curved stroke extraction element for extracting an oblique line and curved stroke (referred to simply as curved stroke hereinafter) with a single-value function from the contour vector by using a four direction classifying method described later; and 14, a curve approximation interval reestablishing element for carrying out a curved stroke extracting function for unifying curved strokes with the single-value function to extract a curved stroke with a multi-value function and a curve approximation interval function for reestablishing a new curve approximation interval with respect to the curved stroke with the multi-value function, to divide the curved stroke with the multi-value function into curved strokes with a single-value function. Numeral 15 denotes a coefficient calculating element for calculating each coefficient of a contour approximation polynominal (n-th spline function) by using bending points with respect to the extracted curved stroke; 16, a residual sum of squares determination element for calculating a residual sum of squares of the coefficients calculated at the coefficient calculating element 15, to determine whether or not the calculated coefficients are correct; 17, a vibration determination element for determining whether or not the calculated polynominal shows the influence of vibration; 18, a contour reproducing part for carrying out a straight line approximation using a digital differential analyzer (DDA) to increase the reference points used for calculation of the coefficient at the coefficient calculating element 15 when the conditions of the residual sum of squares or vibration are not satisfied and the number of bending points is small; 19, a curve approximation compressed data producing element for obtaining the calculated coefficients of the polynominal and coordinates of knots of the polynominal as the compressed data to be stored in the compressed data storage element 22; 30, a straight line approximation compressed data producing element for producing compressed data obtained by a straight line approximation of the horizontal line, vertical line, and an ornament to be stored in the compressed data storage element 22.

The data comprising process mainly comprises the bending point extraction process, the stroke extraction process, the curve approximation interval establishing process, curve approximation interval reestablishing process, and the data producing process. These processes will be described hereinafter in sequence, using as an example a Japanese cursive kana character pronounced "no" shown in FIG. 2.

Figure 3:
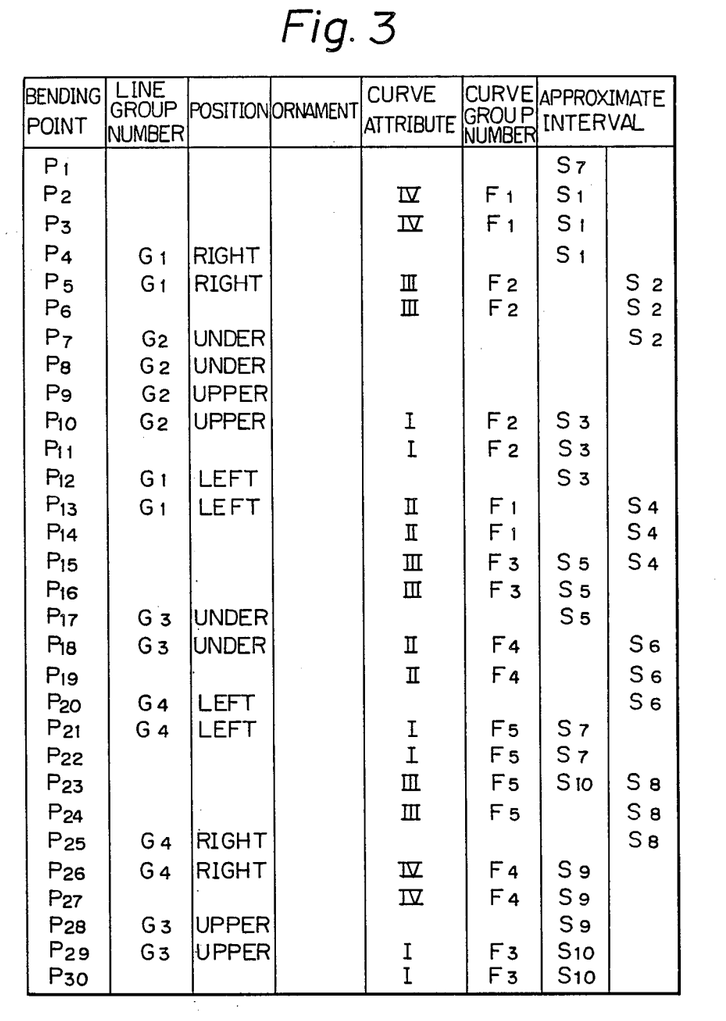
FIG. 3 shows an example of the bending point attribute table according to the present invention.

FIG. 3 shows the bending point attribute table 21 which comprises the extracted bending point including coordinates and attributes thereof, such as a line group number representing a pair of horizontal lines or vertical lines, a position point representing the position of the bending point, i.e., left, right, above or below with respect to the horizontal line and vertical line, the ornament, the curve attribute which is the result of the four direction classification of the vector formed by the bending points $P_i$ and $P_{i+1}$, a curve group number representing a pair of curved strokes, and the curve approximation interval to which the bending point belongs.

Extraction of the bending point

Figure 2:
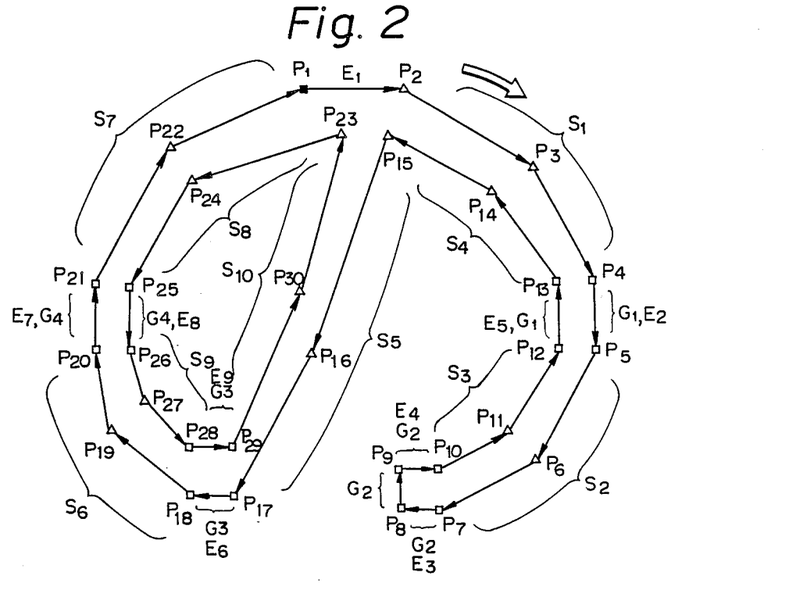
FIG. 2 is an example of a Japanese cursive kana character "no" for explaining the present invention.

First, the bending point on the contour is extracted from the dot pattern stored in the pattern storage element 20 by the bending point extraction element 10. The bending point corresponds to the bending portion on the contour, and in this example as shown in FIG. 2, the bending point is found by tracing the contour from a start point $P_1$ (i.e., a first bending point) in the direction of the arrow——.

That is, the contour of the character forms a closed loop. Therefore, assuming that two adjacent points on the contour represented by a set of dots are a start point $P_s$ and an end point $P_e$, a point P is traced around the contour from the start point to the end point, and a straight line is generated between the start point $P_s$ and the point P by a Digital Differential Analyzer, and a deviation between the straight line and the contour is calculated. If the start point is $P_1$, the bending point is found as an anterior point $P_2$ of a point at which the deviation between the straight line including the start point $P_1$ and the contour is zero. This point $P_2$ is then regarded as the start point $P_s$, and the same process is repeated, whereby the next bending point $P_3$ is found. In this way, all bending points on the contour are found. In the case of the Japanese cursive kana character "no" shown in FIG. 2, bending points $P_1$ to $P_{30}$ are extracted, and the bending point number and the coordinates thereof are stored in the bending point attribute table 21 shown in FIG. 3.

This method for finding the bending point is disclosed in Japanese Unexamined Patent Publication No. (Kokai) 61-208184, entitled "Pattern Information Compressing System", filed by the present applicant.

Extraction of the stroke

The horizontal line, the vertical line, and the ornament are then extracted in such a manner that a segment (a contour vector) obtained by approximating the interval between each bending point (i.e., a segment approximating the contour of the pattern by a straight line) is produced from the coordinates of the bending point, as shown in FIG. 2. That is, the direction of the segment between each bending point is found, and contour numbers $E_3$, $E_4$, and the like are given to the horizontal segments and contour numbers $E_2$, $E_5$ and the like are given to the vertical segments. A contour number is not given to a segment which is not positioned in the horizontal and vertical direction. Pairs are found of the segments having the number $E_i$ (i=1, 2, - - - ), on the basis of the degree of overlapping and distance thereof, and the line group numbers $G_1$ to $G_4$ are given to those pairs. The ornaments are obtained as they are on the end portion of the line group or on the corner formed by two line groups.

The horizontal line and the vertical line can be easily detected by using the coordinates of the bending points. For example, assuming that bending points of both ends of the segment are $P_i$ ($X_1$, $Y_i$) and $P_j$ ($X_j$, $Y_j$), if $X_i=X_j$ and $Y_i \neq Y_j$, the segment is the vertical line, and if $Y_i=Y_j$ and $X_i \neq X_j$, the segment is the horizontal line.

In this example, as shown in FIG. 2 and FIG. 3, bending points $P_4$, $P_5$, $P_7$, $P_8$, $P_9$, $P_{10}$, $P_{12}$, $P_{13}$, $P_{17}$, $P_{18}$, $P_{20}$, $P_{21}$, $P_{25}$, $P_{26}$, $P_{28}$ and $P_{29}$ are recognized as bending points of the horizontal line or the vertical line, a mark "G" is written into the column of the line group number on the table 21, and at the same time, the same number is given to the pair line group. For example, the vertical line of bending points $P_4$ and $P_5$ and the vertical line of bending points $P_{12}$ and $P_{13}$ are marked "$G_1$" as the line group pair. Further, the position of the line group with respect to the central portion of the pair line group is written into the position column.

In the case of the Japanese kana character "no" shown in FIG. 2, the character pattern has no ornament, therefore the ornament column is left blank.

Extraction of the curved stroke and establishment of the curve approximation interval The extraction of the curved stroke and the establishment of the curve approximation interval are then carried out.

Figure 4:
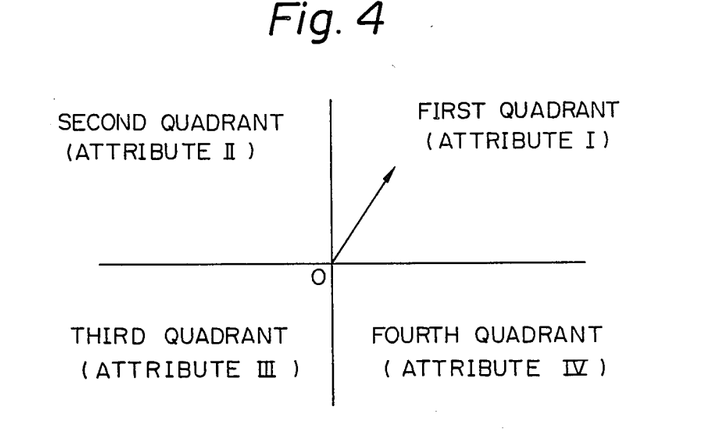
FIG. 4 shows a four direction classification according to the present invention.

(i) First, the direction of the afore-mentioned segment between each bending point is classified into four directions. As shown in FIG. 4, one end point of the segment is position at the origin $\overline{O}$ of the coordinates system, it is determined to which of quadrants I to IV the direction of the segment directed to the other end point belongs, and the curve attribute I, II, III or IV is given to that segment. For example, in FIG. 2, the direction of the segment from point $P_2$ to point $P_3$ is in the fourth quadrant direction, and therefore the curve attribute "IV" is given to the start point $P_2$ of that segment as shown in FIG. 3.

(ii) The curved stroke is then extracted by unifying and grouping a series of continuous bending points having the same curve attribute with respect to extracted segments (bending points) of the curve. For example, bending points $P_2$ and $P_3$ are unified and grouped to extract the curved stroke, as the bending points $P_2$ and $P_3$ are continuous and have the same curve attribute "IV". In this example, curve strokes $S_1$ to $S_{10}$ are extracted.

As described above, the Japanese kana character "no" is approximated by ten curved strokes $S_1$ to $S_{10}$, four pairs of horizontal and vertical lines $G_1$ to $G_4$, and one horizontal line.

Reestablishment of the curve approximation interval

Figure 5:
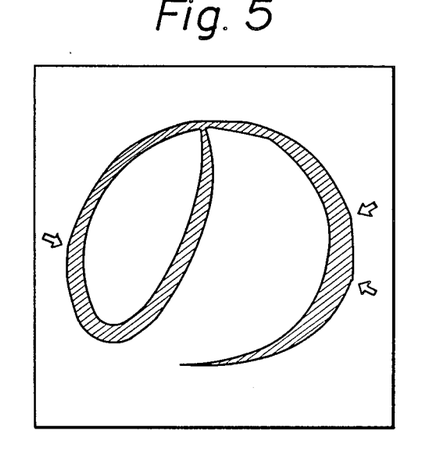
FIG. 5 shows an example of the generation of a non-smooth portion on the character shown in FIG. 2.

When the character pattern is reproduced on the basis of the compressed data produced by carrying out the curve approximation using the curve approximation interval of the extracted curve strokes, a nonsmooth pattern may be obtained. FIG. 5, shows an example of this. In FIG. 5, the reproduced Japanese kana character "no" has nonsmooth portions indicated by arrows ⟶.

The nonsmooth portions of the reproduced pattern occur because of the four direction classification in which the X-Y plane is divided at angles of 0°, 90°, 180°, and 270° is carried out to extract the curved stroke. That is, the curve including the nonsmooth portions shown in FIG. 5 should be originally approximated by the multi-value function. However, in the afore-mentioned four direction classification, the curved stroke with the single-value function is extracted to establish the curve approximation interval. Therefore, with respect to the curved stroke with the multi-value function formed by connecting curved strokes belonging to different quadrants, respectively, the slopes of segments belonging to adjacent quadrants differ at the conjunction point of these segments. As a result, the slope at the conjunction point becomes 0 or ∞, and thus the smoothness is lost at that conjunction point.

Therefore, the reestablishment of the curve approximation interval is carried out to produce compressed data with which a smooth pattern can be obtained. This reestablishment is carried out in such a manner that the curved stroke with the multi-value function is extracted from the curved strokes with the single-value function, a new curve approximation interval is reestablished with respect to the extracted curved stroke with the multi-value function, and the curved strokes with the single-value function are again produced by a different four direction classification.

Figure 6:
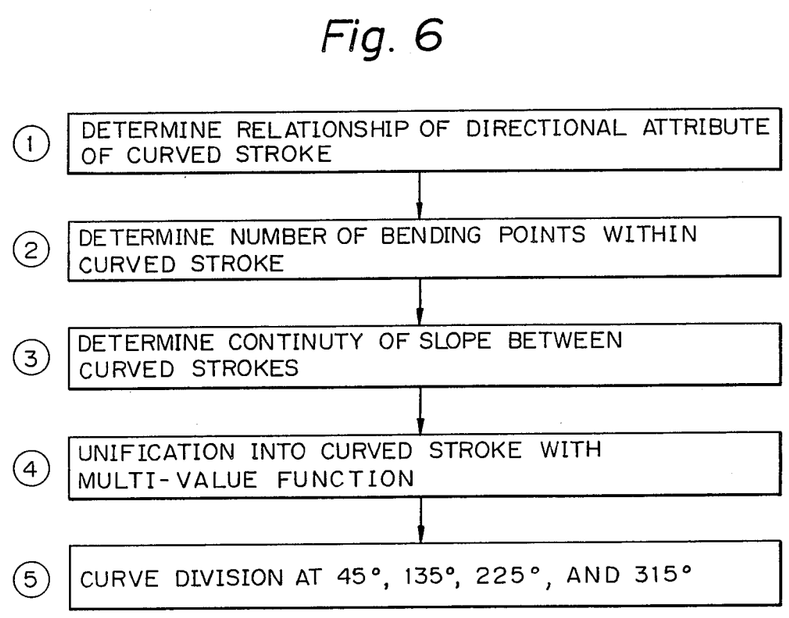
FIG. 6 is a flow chart showing the procedure for reestablishing the curve approximation interval.
Figure 7A:
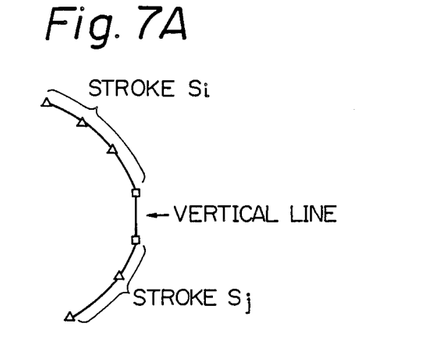
FIGS. 7A to 7F are drawings explaining an operation for unifying curved strokes.
Figure 7B:
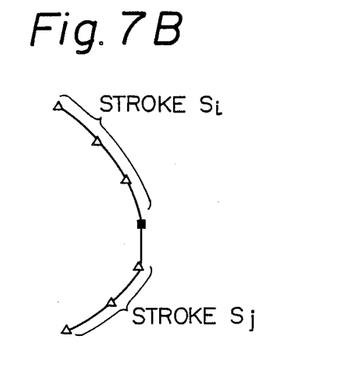
Figure 7C:
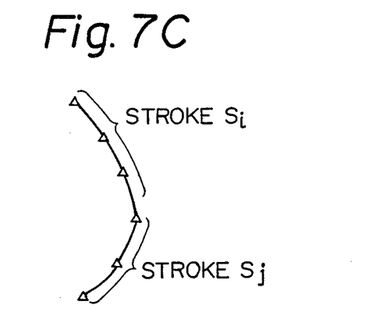
Figure 7D:
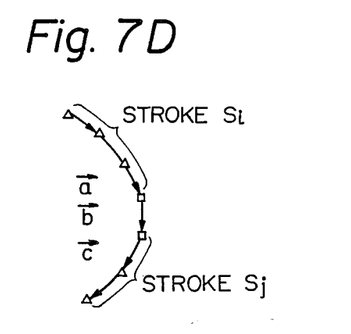
Figure 7E:
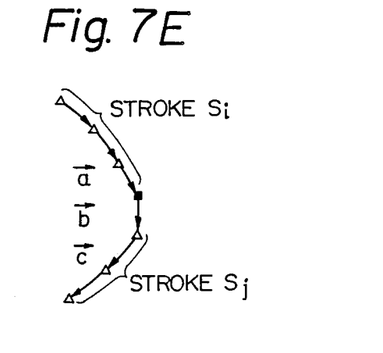
Figure 7F:
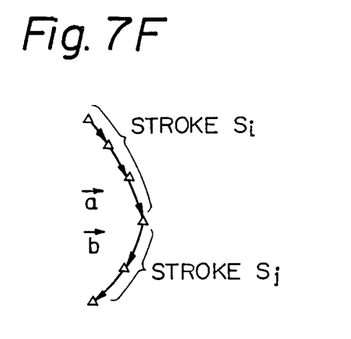
Figure 8A:
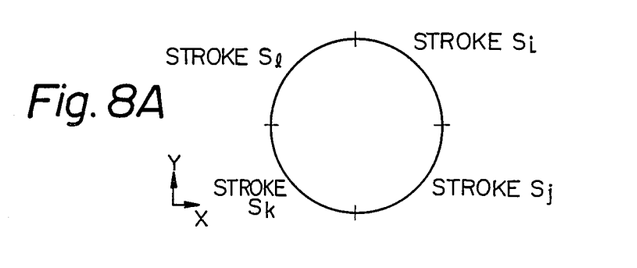
FIGS. 8A and 8B are drawings explaining a new four direction classification for reestablishing a new curve approximation interval.
Figure 8B:
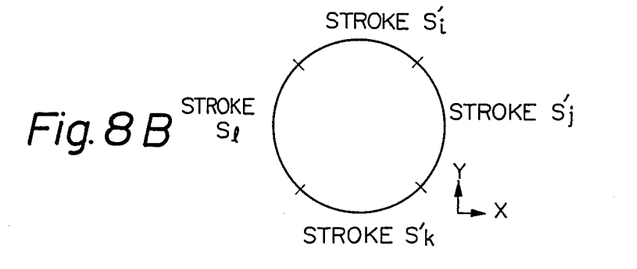
Figure 9:
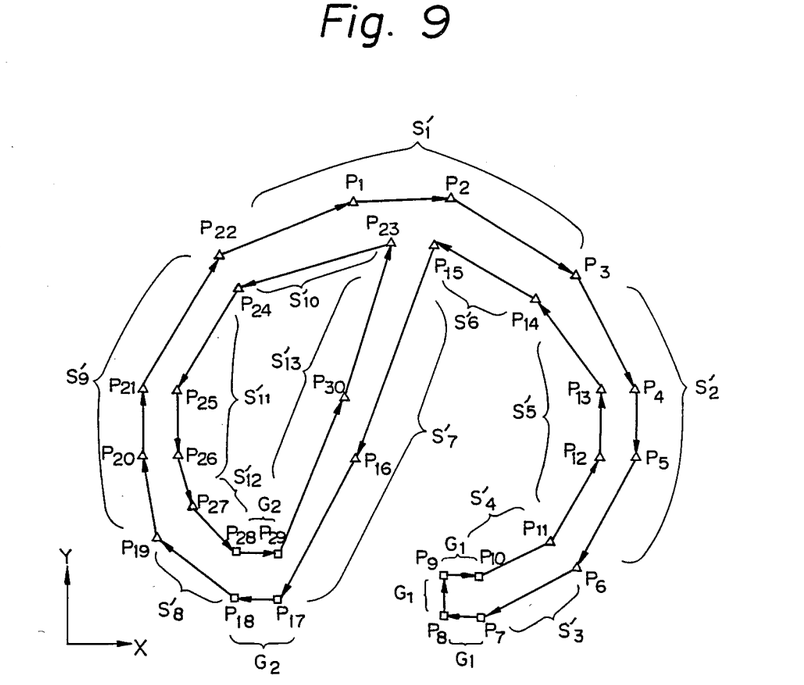
FIG. 9 shows the reestablished curve approximation intervals with respect to the character shown in FIG. 2.
Figure 10:
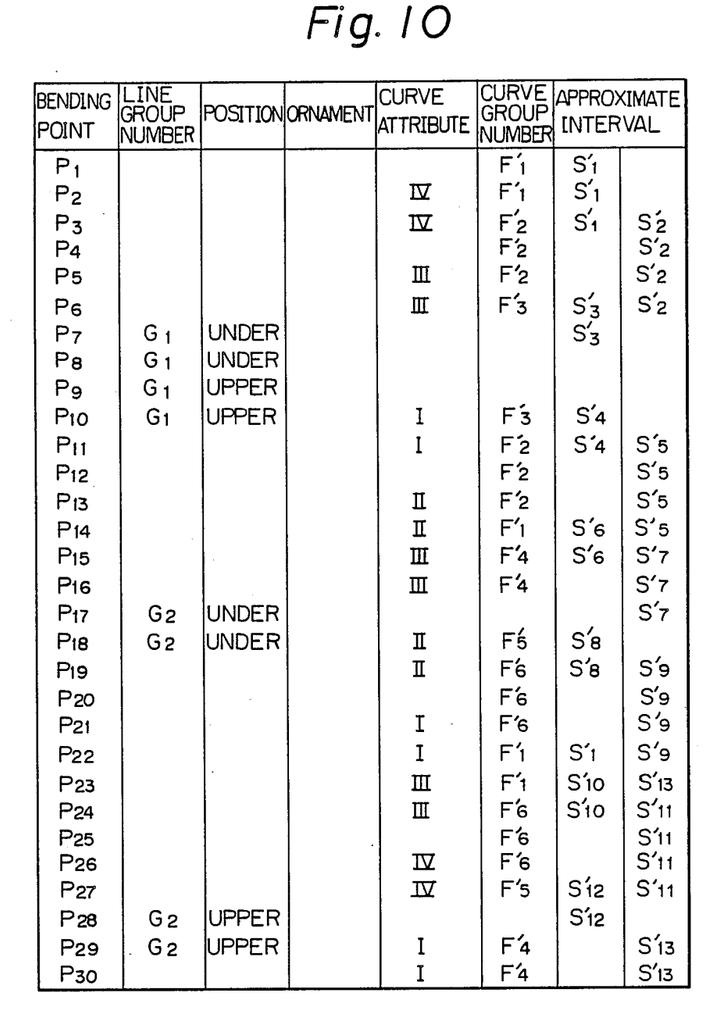
FIG. 10 shows the bending point attribute table after reestablishment is carried out.

FIG. 6 is a flow chart showing the procedure for reestablishing the curve approximation interval, FIGS. 7A to 7F explain an operation for unifying curved strokes, FIGS. 8A and 8B explain the new four direction classification for reestablishing new curve approximation interval, FIG. 9 shows the reestablished curve approximation intervals with respect to the Japanese kana character "no" shown in FIG. 2, and FIG. 10 shows the bending point attribute table after the reestablishment is carried out.

The extraction of the curve with the multi-value function is carried out on the basis of curve attributes I to IV of the curve approximation interval (curved stroke), the number of bending points between the curved strokes, and the continuity of slopes between the curved strokes.

(i) First, the relationship of the direction attributes of the curved strokes is investigated. As shown in FIG. 3, each of the curved strokes $S_1$ to $S_{10}$ has curve attributes I to IV, and it is determined whether or not the relationship of the curve attribute shown in the following Table 1 is satisfied between adjacent curved strokes $S_i$ and $S_j$.

TABLE 1

| curved stroke $S_i$ | curved stroke $S_j$ |
| --- | --- |
| attribute I | attribute II or IV |
| attribute II | attribute I or III |
| attribute III | attribute IV or II |
| attribute IV | attribute III or I |

This table shows whether or not the adjacent curved strokes $S_i$ and $S_j$ belong to adjacent quadrants in FIG. 4. If this relationship is satisfied, these adjacent curved strokes $S_i$ and $S_j$ with a single-value function may be unified as one curved stroke with a multi-value function.

(ii) the number of bending points between adjacent curved strokes is then determined. This operation is explained with reference to FIGS. 7A to 7C. In principle, the unification of adjacent curved strokes is possible when the number of bending points existing between adjacent curved strokes is two or less.

That is, it is determined that a unification of adjacent curved strokes $S_i$ and $S_j$ is possible when a short vertical line within a certain threshold length having two bending points exists between adjacent curved strokes $S_i$ and $S_j$, as shown in FIG. 7A, when one bending point having no attribute exists between adjacent curved strokes $S_i$ and $S_j$ as shown in FIG. 7B, and when adjacent curved strokes $S_i$ and $S_j$ are in direct contact.

That is, when the number of bending points between adjacent curved strokes $S_i$ and $S_j$ is small, the unification to the curved stroke having the multi-value function is easy, since such adjacent curved strokes have been considered from the start as a curved stroke having the multi-value function.

(iii) The continuity of slopes of the adjacent curved strokes $S_i$ and $S_j$ is then determined. Even though the adjacent curved strokes satisfy the afore-mentioned unifying condition, if there is no continuity of slopes between adjacent curved strokes, the adjacent curved strokes $S_i$ and $S_j$ can not be considered smooth curved stroke having the multi-value function.

FIGS. 7D to 7F explains the continuity of the slopes. These FIGS. 7D to 7F correspond to FIGS. 7A to 7C, respectively.

The continuity of slopes at the unified portion can be quantitatively determined by an inner product of contour vectors, and the result compared with a predetermined threshold $\theta_{th}$.

Assuming that the curved strokes $S_i$ and $S_j$ are contour vectors $\vec{a}$ and $\vec{c}$ respectively, and a contour vector therebetween is vector $\vec{b}$ in FIGS. 7D and 7E, and curved strokes $S_i$ and $S_j$ are contour vectors $\vec{a}$ and $\vec{b}$ in FIG. 7F, the unification of the curved strokes $S_i$ and $S_j$ is possible when the following conditions are satisfied.

$$\left. \begin{array}{c} \cos \theta_{ab} > \theta_{th} \\ \cos \theta_{bc} > \theta_{th} \end{array} \right\} \quad (1)$$

Here, $\theta_{ab}$ denotes an angle made by vectors a and b; and $\theta_{bc}$ an angle made by vectors b and c. That is, when the inner product is more than the threshold $\theta_{th}$, unification of curved strokes $S_i$ and $S_j$ becomes possible.

(iv) The unification of curved strokes $S_i$ and $S_j$ is carried out to extract the curved stroke having the multi-value function when the three afore-mentioned conditions are satisfied. When curved strokes are extracted as shown in FIG. 2, strokes $S_6$, $G_4$, $S_7$, $S_1$, $G_1$ and $S_2$ (i.e., from the bending point $P_{18}$ to the bending point $P_7$ in the clockwise direction) are unified to extract a first curved stroke having the multi-value function, strokes $S_8$, $G_4$ and $S_9$ (i.e., from the bending point $P_{23}$ to the bending point $P_{28}$ in the counterclockwise direction) are unified to extract a second curved stroke having the multi-value function, and strokes $S_3$, $G_1$ and $S_4$ are unified to extract a third curved stroke having the multi-value function.

(v) The curved stroke having the multi-value function extracted by the unification is then divided into curved strokes having the single-value function, to reestablish new curve approximation intervals.

As afore-mentioned, the extraction of the curved stroke is carried out by using the four direction classification in which X-Y plane is divided at angles 0°, 90°, 180°, and 270°, as shown in FIG. 4. That is, the curved stroke having the multi-value function is divided into curved strokes having the single-value function at angle positions 0°, 90°, 180° and 270°. The conjunction point of adjacent curved strokes belonging to adjacent quadrants has the slope of 0 or $\infty$, since these curve strokes are approximated by the single-value function with respect to the X or Y coordinates, and thus the smoothness is lost.

If the dividing angles on the X-Y plane are changed, the division at the angle positions 0°, 90°, 180° and 270°, where the slope becomes 0 or $\infty$, is prevented. For this purpose, as shown in FIG. 8B, the division of the curve is carried out at angles 45°, 135°, 225°, and 315° made by the X axis for the multi-value function curve, to reestablish the curve approximation interval. This is carried out is such a manner that bending points closest to angle positions 45°, 135°, 225°, and 315° with respect to the X axis are determined as dividing points for dividing the curve.

As shown in FIG. 9, bending points closest to angle positions 45°, 135°, 225°, and 315° among bending points unified to the curved strokes having the multi-value function are points $P_3$, $P_6$, $P_{11}$ $P_{14}$, $P_{19}$, $P_{22}$, $P_{24}$ and $P_{27}$. When these points are determined as the dividing point, the first curved stroke having the multi-value function is divided into a curved stroke $S_8'$ from the point $P_{18}$ to $P_{19}$, a curved stroke $S_9'$ from the point $P_{19}$ to $P_{22}$, a curved stroke $S_1'$ from the point $P_{22}$ to the point $P_3$, a curved stroke $S_2'$ from the point $P_3$ to the point $P_6$, and a curved stroke $S_3'$ from the point $P_6$ to the point $P_7$. These newly divided curved strokes define the new curve approximation interval, respectively.

In the same way, the second curved stroke having the multi-value function is divided into a curved stroke $S_{10}'$ from the point $P_{23}$ to the point $P_{24}$, a curved stroke $S_{11}'$ from the point $P_{24}$ to the point $P_{27}$, and a curved stroke $S_{12}'$ from the point $P_{27}$ to the point $P_{28}$, and the third curved stroke having the multi-value function is divided into a curved stroke $S_4'$ from the point $P_{10}$ to the point $P_{11}$, a curved stroke $S_5'$ from the point $P_{11}$ to the point $P_{14}$, and a curved strokes $S_6'$ from the point $P_{14}$ to the point $P_{15}$.

The curve approximation intervals in the bending point attribute table 21 are rewritten in accordance with curved strokes thus divided, as shown in FIG. 10. Also, the curve group numbers are rewritten as $F_1'$ to $F_6'$ to correspond to the above-mentioned change. As a result, the reestablishment of the curve approximation interval is carried out. The curve approximation interval of the curved stroke which is not unified, for example, strokes $S_5$ and $S_{10}$ in FIG. 2, is left as it is, and is represented by strokes $S_7'$ and $S_{13}'$ (corresponding to strokes $S_5$ and $S_{10}$ in FIG. 2) in FIG. 9.

When the character pattern is reproduced on the basis of the compressed data obtained by using the above-mentioned reestablished curve approximation interval, a pattern having smoothness at the conjunction point between adjacent strokes is obtained.

Curve approximation

The compressed data is produced on the basis of the content of the bending point attribute table 21 produced as described above, in particular, coordinates of the bending points and attributes of the bending point such as the line group number, the ornament, the curve attribute, the curve group number, and the curve approximation interval are produced. The horizontal line, the vertical line, and the ornament are extracted as the straight line for the straight line approximation, and on the other hand, the extracted curved stroke is used as for the curve approximation.

First, the curve approximation of the curve approximation interval will be explained. There are many methods for approximating a proper curve when the curve approximate interval is established. In this example, a smoothing method using a spline function of the n-th degree, particularly a B-spline function which is numerically stable, is adopted. In this method, the coefficient and coordinates of the knots of the polynominal need to be stored, instead of a large number of bending points of the curve portion, and therefore, the amount of data to be stored is noticeably reduced.

In the smoothing method using the B-spline function, the function is determined by calculating the coefficient and knots of the polynominal on the basis of a condition of a least square approximation. There are two well known method for obtaining a series of knots; a fixed knot method wherein the series of knots is obtained externally, and a knot addition method (sequential dividing method) wherein the series of knots is adaptively obtained internally. Further, there are many methods for obtaining the series of knots in accordance with the shape of the curve. In this example, the knot addition method is adopted.

The calculation of the coefficient in the smoothing method of the spline function of the n-th degree is carried out as follows.

First, both end points of the curve approximation interval are determined from the point series data of the curved portion, and an observation error is determined on the basis of a general expression (2) for the smoothing method in which the B-spline function is used, shown as follows. Then the coefficient of the polynominal for the curve approximation is calculated.

$$S(x) = \sum_{j=-m+1}^{n_t-1} C_j N_j, \ m + 1(x) \quad (2)$$

wherein, m is the degree, $n_t$ is the number of knots, $C_j$ is the coefficient, and $N_j$, $m+1(x)$ is the divided difference of the $(m+1)_{th}$ order.

The coefficient $C_j$ is found on the basis of a condition of a least-square approximation. Generally, the knots are determined from the curve data, then a weight $\sigma_i$ of the residual sum of squares (referred as an observation error hereinafter) is determined so as to satisfy a condition of a constant relative error of the following expression (3).

$$\frac{\sigma_i}{y_i} = C_{th} \quad (3)$$

wherein, $\sigma_i$ is the observation error of the i-th reference point, $y_i$ is the y-coordinate of the i-th reference point, and $C_{th}$ is the threshold.

The observation error $\sigma_i$ represents the weight of the reference point, i.e., that point which is regarded as important. Here, the degree m of the spline function is set to 3, the observation errors $\sigma_i$ with respect to both end points are each set to a smallest value, and the observation error $\sigma_i$ with respect to the other reference point between both end points is set to a value proportional to the slope of the curve corresponding to that reference point.

The coefficient of the spline function $S(x)$ is determined to satisfy the following expression (4).

$$\delta^2 = \sum_{i=1}^{n} \frac{1}{\sigma_i^2} \{y_i - S(x_i)\}^2 \leq \delta_{th}^2 \quad (4)$$

wherein, $\delta^2$ is the residual sum of squares, $\delta_{th}^2$ is the threshold of the residual sum of squares, and n is the total number of reference points.

On the other hand, when the coefficient of the smoothing method of the spline function is calculated, if the observation error is fixed to a constant value, the following problems arise.

1. both end points can not be fixed.
2. approximately horizontal curves becomes distorted.
3. approximately vertical curves having a steep slope become distorted.

Item 1. means that both end points are treated in the same way as other reference points with respect to the observation error. Item 2. causes an overlarge observation error with respect to an almost horizontal curve. Item 3. causes a too small observation error with respect to an almost vertical curve, since the observation error is determined in proportion to the slope.

Figure 11A:
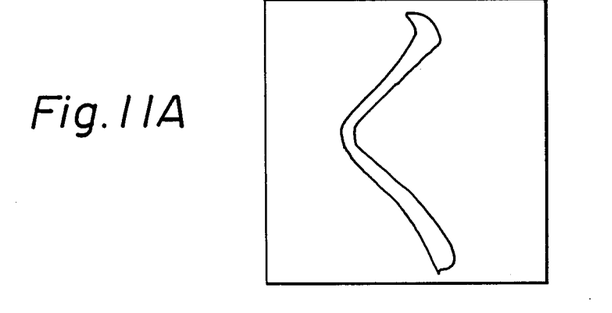
FIGS. 11A to 11C show examples of problems of the prior art.
Figure 11B:
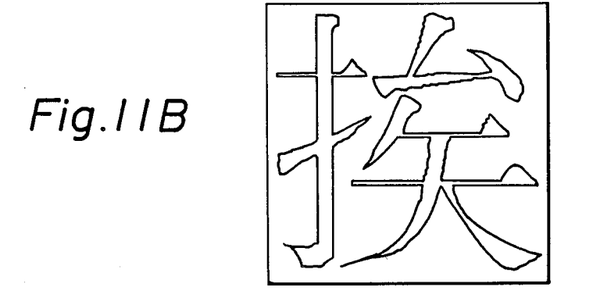
Figure 11C:
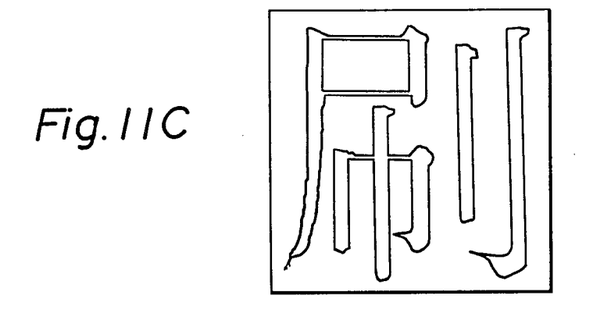

FIGS. 11A to 11C show examples of problems of the prior art, wherein FIG. 11A shows an example of a so called "mustache" produced because both end points are not fixed, as in item 1, FIG. 11B shows an example where an unnatural approximated curve of an almost horizontal curve is produced, as in item 2, and FIG. 11C shows an example where an unnatural approximate curve of an almost vertical curve is produced, as in item 3.

These problems can be solved by determining the observation error with respect to both end points of the curve approximation interval to the smallest value, and determining the observation error with respect to the other reference point within the curve approximation interval to produce a value in proportion to the slope at the point in question.

The calculation of the slope, the determination of the observation error, and the selection of the single-value function of the X or Y axis are carried out as follows.

(1) Calculation of the slope.

Assuming that the X-Y coordinates of the i-th bending point are $(X_i, Y_i)$ and the X-Y coordinates of the $(i+1)$th bending point are $(X_{i+1}, Y_{i+1})$, the slope $D_i$ of the i-th bending point is determined as follows.

$$D_i = \frac{Y_{i+1} - Y_i}{X_{i+1} - X_i} \quad (5)$$

(2) Determination of the observation error.

The observation error $\sigma_i$ is determined as follows, by using the slope $D_i$.

(i) At both end points, $\sigma_i = C_{th1}$
(ii) At points other than both end points,
  (a) When $Y_{i+1} - Y_i = 0$; $\sigma_i = C_{th2}$
  (b) When $X_{i+1} - X_i = 0$; $\sigma_i = C_{th3}$
  (c) When $X_{i+1} - X_i \neq 0$ and $Y_{i+1} - Y_i \neq 0$;
    $\sigma_i = C_{th4} \cdot D_i$ Where, $\sigma_i \leftarrow C_{th3}$ when $\sigma_i \leq C_{th3}$, and $\sigma_i \leftarrow C_{th2}$ when $\sigma_i < C_{th2}$.

In the present example, thresholds $C_{th1}$ to $C_{th4}$ are determined as follows.

$C_{th1} = 0.1$
$C_{th2} = 0.5$
$C_{th3} = 50$
$C_{th4} = 5$ (3) Selection of the single-value function of the X or Y axis.

Figure 12A:
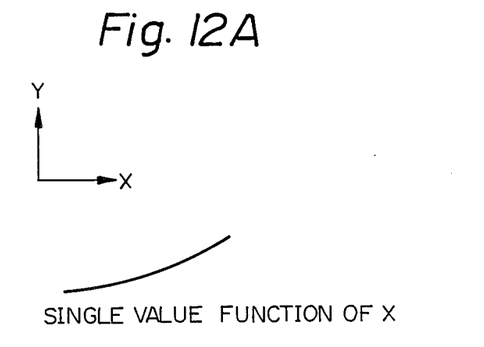
FIGS. 12A to 12C explain the classification of the shape of the curve.
Figure 12B:
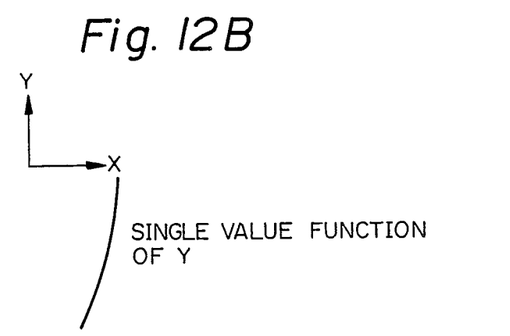
Figure 12C:
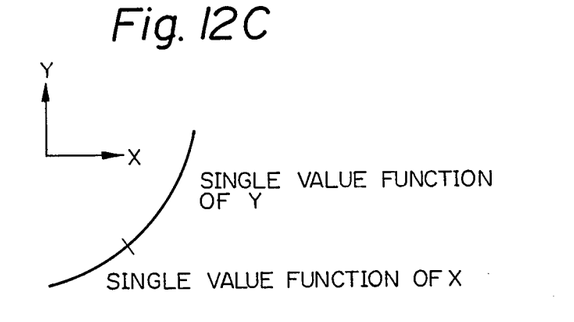

The shape of the curve is classified into three types, as shown in FIGS. 12A to 12C, on the basis of the calculated slope. When the curve is almost horizontal as shown in FIG. 12A, the curve is approximated as the single-value function of the X axis in the way shown by the afore-mentioned expression (2).

When the curve is almost vertical as shown in FIG. 12B, the curve is approximated as the single-value function of the Y axis as shown by the following expression (6), wherein the X and Y of expression (2) are switched. Further, the coefficient $C_j$ of the expression (6) is determined so as to satisfy the following expression (7) in which the X and Y of expression (4) are switched.

$$S(y) = \sum_{j=-m+1}^{n_t-1} C_j N_{j, m+1}(y) \quad (6)$$

$$\delta^2 = \sum_{i=1}^{n} \frac{1}{\sigma_i^2} \{x_i - S(y_i)\}^2 \leq \delta_{th}^2 \quad (7)$$

The slope $D_{iy}$ with respect to the Y axis is calculated as follows by switching X and Y.

$$D_{iy} = \frac{X_{i+1} - X_i}{Y_{i+1} - Y_i}$$

The observation error $\sigma_i$ is determined as follows, by using this slope $D_{iy}$.

(i) At both end points, $\sigma_i = C_{th1}$
(ii) At points other than both end points,
  (a) When $X_{i+1} - X_i = 0$; $\sigma_i = C_{th2}$
  (b) When $Y_{i+1} - Y_i = 0$; $\sigma_i = C_{th3}$
  (c) When $X_{i+1} - X_i \neq 0$ and $Y_{i+1} \times -Y_i \neq 0$;
    $\sigma_i = C_{th4} \cdot D_{iy}$ Where, $\sigma_i \leftarrow C_{th3}$ when $\sigma_i > C_{th3}$, and $\sigma_i \leftarrow C_{th2}$ when $\sigma_i < C_{th2}$.

Figure 13:
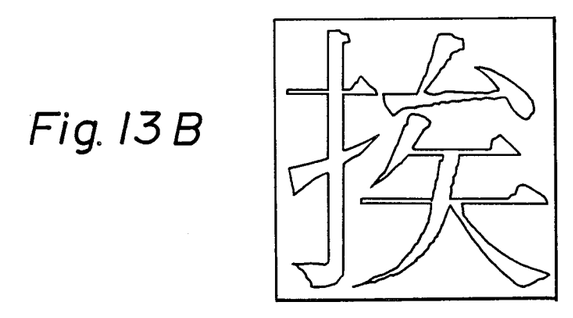
FIGS. 13A to 13C show character patterns produced according to the present invention.
Figure 13A:
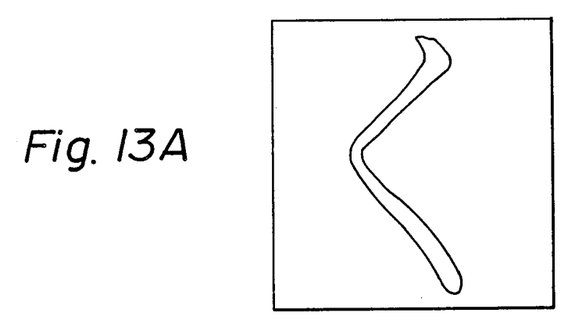
Figure 13C:
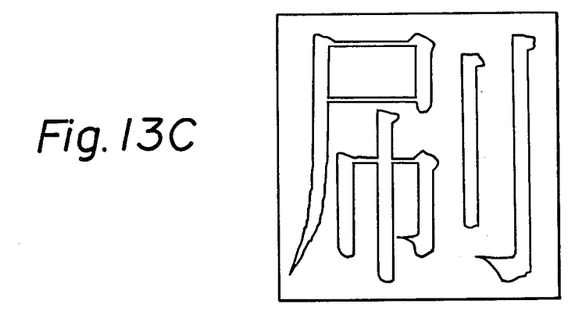

When the curve has an almost horizontal portion and an almost vertical portion at the same time, as shown in FIG. 13C, the curve is divided into two portions and the part having the almost horizontal portion is approximated by the single-value function of the X axis and the part having the almost vertical portion is approximated by the single-value function of the Y axis.

The classification of the curved shape is carried out as follows. That is, when the number of bending points $P_i$ is N (i.e. $i = 1, 2, \cdots N$), these bending points are divided into two sections, i.e., one having bending points $P_i$ $$\left( i = 1, 2, \ldots \frac{N}{2} \right)$$

and the other having bending points $$P_i \left( i = \frac{N}{2} + 1, \ldots N \right).$$

Then the mean value $M_d$ of slopes $D_i$ of the bending point is calculated for each section.

The calculation of the mean value $M_d$ carried out as follows, on the basis of an angle $\theta_i$ formed by the vector $(X_{i+1} - X_i, Y_{i+1} - Y_i)$ and the X axis and a length $d_i$ of the vector.

$$d_i = \sqrt{(X_{i+1} - X_i)^2 + (Y_{i+1} - Y_i)^2} \quad (8)$$

$$M_d = \frac{\sum_{i=1}^{N-1} d_i \cdot \cos \theta_i}{\sum_{i=1}^{N-1} d_i} \quad (9)$$

When the mean value $M_d$ is less than the threshold $M_{th}$, the curve is considered to be almost vertical.

When both mean values $M_d$ with respect to two divided sections are greater than the threshold $M_{th}$, the curve is determined to be the curve shown in FIG. 12A. When both means values $M_d$ are less than the threshold, the curve is determined to be the curve shown in FIG. 12B. In each case, the curve approximation is carried out without dividing the curve. In other cases, the curve is determined as shown in FIG. 12C, and the curve is divided into two portions, and the single-value function of the X-axis and the single-value function of the Y-axis are used for these two portions respectively to carry out the curve approximation. In the present example, the threshold $M_{th}$ is 0.3.

FIGS. 13A to 13C show the character pattern produced according to the present invention. FIGS. 13A and 13B show character patterns when the observation error is determined according to the afore-mentioned processes (1) and (2), and FIG. 13C shows the character pattern produced by the selection of the single-value function of the X or Y axis shown by the afore-mentioned process (3).

Determination of vibration

As afore-mentioned, in the present invention, the number of the extreme values existing within the curve approximation interval is previously known. Therefore, the generation of vibration can be detected by investigating the number of extreme values after the curve approximation is carried out. That is, the curved stroke of the single-value function originally has no extreme value within the curve approximation interval, therefore the generation of vibration can be detected by investigating the existence of the extreme value.

First, the method for determining whether or not vibration exists with respect to the curved stroke of the original single-value function will be explained. The extreme value may be detected by finely dividing the obtained approximated curve, and then determining the sign of the differential coefficient at each point. However, in the present example, the detection is carried out as follows, to shorten the time needed for calculating the differential coefficient.

That is, each curved stroke is established by classifying the vector between bending points into four directions (i.e., attributes) at intervals of 90° and grouping the vectors having the same curve attribute. Therefore, each curved stroke does not originally have an extreme value. Then, by dividing the curved stroke into a plurality of sections and determining the attribute of each section, the existence of the extreme value can be detected, and thus the generation of vibration can be detected. Assuming that the X-coordinate of the i-th divided point is $x_i$ and the Y-coordinate is $S(x_i)$, the curve attribute is found by determining the signs of $(x_{i+1}-x_i)$ and $[S(x_{i+1})-S(x_i)]$ at the interval of the $(i+1)_{th}$ and i-th points.

The process for determining the vibration will be now explained.

Step 1: The curve is divided into $(N_s-1)$ segments by $N_s$ dividing points.

Step 2: The curve attribute of the first dividing point (i=1) is determined. That is, the attribute is determined by detecting the signs of $(x_2-x_1)$ and $[S(x_2)-S(x_1)]$ and referring to Table 2, described later.

Step 3: The attribute of the second dividing point (i=2) is determined in the same way, and then a determination is made whether or not it coincides with the attribute of the first dividing point (i=1).

Step 4: If a coincidence of the attributes is obtained, then the attribute of third dividing point (i=3) is found, and coincidence with the first dividing point is determined. If the coincidence of the attribute is not obtained, it is determined that vibration is generated, and the process is terminated.

Step 5: The same process as in step 4 is carried out for dividing points from i=4 to i=$N_s$−1, and if a coincidence of the attributes from the first dividing point through the $(N_s-1)_{th}$ dividing point is confirmed, it is determined that vibration does not exist.

Next, method for determining whether or not the vibration exists with respect to the curved stroke of the original multi-value function will be explained. Each stroke of the unified curved stroke of the multi-value function is obtained by unifying curved strokes of the single-value function then re-dividing the unified curved stroke. Therefore, the directional attribute of each stroke of the unified curved stroke with the multi-value function is obvious from the directional attributes of the curved strokes with the single-value function. For example, in FIG. 9, the reestablished curve approximation interval $S_2'$ includes two directional curve attributes III and IV. The process for determining the vibration with respect to the curved stroke with the multi-value function will be now explained.

Step 1': The curve attribute with respect to a certain curve approximation interval is determined from the bending point attribute table. If all of the curve attributes within the interval are the same, it is considered that the interval has no extreme value, and the afore-mentioned steps 1 to 5 are carried out to determine the vibration. Otherwise, two kind of attributes are stored in registers AT(1) and AT(2).

Step 2': The curve is divided into $(N_s-1)$ portions by $N_s$ dividing points.

Step 3': The curve attributes of each dividing point is determined by finding the signs $(x_{i+1}-x_i)$ and $[S(x_{i+1})-S(x_i)]$ and referring to Table 2.

Step 4': After the curve attributes of all dividing points have been determined, when the number of kinds of curve attributes is $N_{atr}$, these $N_{atr}$ attributes are stored in register AT'(1) to AT'($N_{atr}$) respectively.

Step 5': If the number $N_{atr}$ is not 2, it is considered that vibration is generated, and the process is terminated.

Step 6': When AT(1)=AT'(1) and AT(2)=AT'(2), it is determind that there is no vibration; if not, then the existence of vibration is determined.

TABLE 2

| attribute | valuation | |
|---|---|---|
| | $x_{l+i} - x_i$ | $S(x_{l+i}) - S(x_i)$ |
| I | + | + |
| II | + | − |
| III | − | + |
| IV | − | − |

Reproduction of the contour of the curved stroke

The reproduction of the contour of the curved stroke is carried out on the basis of the afore-mentioned expression (2).

When the number of bending points is small, it is difficult to obtain a proper curve since the reliability of the error obtained from the afore-mentioned expression (4) is low and the possibility of vibration is high. Therefore, when the number of bending points is small, the curve approximation is carried out in such a manner that the number of reference points is increased by connecting the bending points by a straight line generated by the DDA. Further, even when the number of bending points is large, if the error condition of the expression (4) and afore-mentioned vibration determination condition are not satisfied, the curve approximation is carried out in such a manner that the number of reference points is increased by connecting between bending points by a line generated by the DDA.

That is, the coefficient calculating element 15 finds the coordinates of bending points within each curve approximation interval from the bending point attribute Table 21, the contour reproducing element 18 generates a series of notes, coefficient $C_j$ and S(x) are calculated on the basis of the expression (2), the residual sum of squares with respect to the S(x) found by the expression (4) is calculated at the residual sum of squares calculating element 16, the coefficient $C_j$ is calculated again so that the residual sum of squares satisfies the expression (4), the vibration determination is carried out at the vibration determining elements 17, the calculation of the coefficient is again carried out when the vibration determining condition is not satisfied, and thus the coefficient $C_j$ satisfying both conditions of the residual sum of squares and the vibration determination is found.

As described above, when the coefficient $C_j$ of the B-spline function is found, the compressed data producing element 19 stores the coefficient $C_j$ and the coordinates of knots of the B-spline function as the compressed data, into the compressed data storage element 22. Also, for the horizontal line, the vertical line, and the ornament, the compressed data producing element 30 stores end points of the straight line as compressed data into the compressed data storage element 22.

Although a preferred embodiment has been described heretofore, various modifications and alternations are possible within the scope of the present invention.

For example, in the afore-mentioned embodiment, the extraction of the curved stroke with the multi-value function is carried out under the condition shown in FIG. 8. However, the number of bending points between strokes and the threshold $\theta_{th}$ can be properly selected according to the needed smoothness of the curve. Further, the curve dividing angles for reestablishing the curve approximation interval are not limited to 45°, 135°, 225° and 315°, and other angles may be used for this reestablishment. Further, although the above embodiments of the present invention have been described with reference to Japanese kana characteristics, it will be obvious to a person skilled in the art the principle of the present invention can be also applied to the correction of Roman alphabet characters, Arabic numerals, and any curved symbol or characteristic displayed on a computer or other screen.

We claim:

1. A method for compressing image data, representing an image containing at least one curve portion, by generating coded data defining an outline of the curved portion, the coded data being decodable to reproduce the image, said method comprising the steps of:
    (a) extracting bending points of the outline from the image data, the bending points dividing the outline into segments;
    (b) classifying the segments using a four-quadrant directional classification system, each segment having a single classification associated therewith;
    (c) grouping each series of consecutive segments having identical classification into an arc; and
    (d) calculating an approximate curve to represent the outline of the curved portion; using a curve approximation function having a curve approximation interval defined by the end points of each arc.

2. A method according to claim 1, further comprising the steps of:
    (e) carrying out an error evaluation with respect to a reference point on the approximate curve; and
    (f) repeating step (d) under a new condition when the error evaluation does not satisfy a predetermined threshold.

3. A method in accordance with claim 2, wherein step (e) comprises varying a weight of the error evaluation in accordance with a slope of the approximate curve at the reference point.

4. A method in accordance with claim 3, further comprising the step of (e) selecting one of a single-value function with respect to an X axis and a single-value function with respect to a Y axis for said calculating in step (d).

5. A method in accordance with claim 3, wherein the weight of the error evaluation is a fixed value at both end points of the curve approximation interval.

6. A method in accordance with claim 5, further comprising the step of (e) selecting one of a single-value function with respect to an X axis and a single-value function with respect to a Y axis for said calculating in step (d).

7. A method according to claim 1 wherein the curve approximation function is a B-spline function.

8. A method according to claim 1, further comprising the steps of:
    (e) determining a number of directions of the approximate curve in dependence upon the slope of the approximate curve at points lying thereon; and
    (f) deciding whether vibration is generated on the approximate curve according to the number of directions of the approximate curve.

9. A method in accordance with claim 8, further comprising repeating step (d) under a new condition when the vibration is generated.

10. A method in accordance with claim 1, further comprising the step of (e) selecting one of a single-value function with respect to an X axis and a single-value function with respect to a Y axis for said calculating in step (d).

11. A method in accordance with claim 1, wherein further comprising the steps of:
    (e) combining arcs defined by a single-value function into a combined arc with a multi-value function;
    (f) dividing the combined arc with the multi-value function using a new four-direction classification system to reestablish curve approximation intervals; and
    (g) carrying out curve approximation for the reestablished curve approximation intervals.

* * * * *